United States Patent [19]
Tisbo et al.

[11] Patent Number: 5,887,878
[45] Date of Patent: Mar. 30, 1999

[54] GARDENING CENTER

[75] Inventors: Thomas A. Tisbo, Barrington Hills; Torrence C. Anderson; Michael R. Vogler, both of Aurora, all of Ill.

[73] Assignee: Suncast Corporation, Batavia, Ill.

[21] Appl. No.: 792,862

[22] Filed: Jan. 31, 1997

[51] Int. Cl.[6] .................................................. B62B 1/20
[52] U.S. Cl. .................................. 280/47.19; 280/47.26; 280/47.35
[58] Field of Search ............................. 280/47.35, 47.19, 280/47.26, 47.24, 43, 47.34, 79.11, 79.3; D34/16, 24, 25; 312/249.8, 249.11, 249.12; 211/126.15, 133.1, 189

[56] References Cited

U.S. PATENT DOCUMENTS

| | | | |
|---|---|---|---|
| D. 336,708 | 6/1993 | Boughey | D34/21 |
| D. 354,186 | 1/1995 | Grosfillex | D31/21 |
| D. 355,515 | 2/1995 | Spear et al. | D34/16 |
| D. 361,419 | 8/1995 | Snell | D34/21 |
| D. 361,420 | 8/1995 | Riek | D34/17 |
| 3,868,123 | 2/1975 | Berg et al. | 280/79.2 |
| 4,043,278 | 8/1977 | Kessler et al. | 108/150 |
| 4,824,137 | 4/1989 | Bolden | 280/47.26 |
| 5,083,805 | 1/1992 | Monch et al. | 280/47.35 |
| 5,213,351 | 5/1993 | Chen | 280/47.26 |
| 5,318,315 | 6/1994 | White t al. | 280/47.26 |
| 5,615,903 | 4/1997 | Spear et al. | 280/47.19 |

FOREIGN PATENT DOCUMENTS

| | | | |
|---|---|---|---|
| 246395 | 1/1926 | United Kingdom . | |
| 1 127 848 | 9/1968 | United Kingdom . | |
| 1 278 928 | 6/1972 | United Kingdom . | |
| 1 315 842 | 5/1973 | United Kingdom | B65D 19/38 |
| 2 247 650 | 11/1992 | United Kingdom | B62B 1/12 |
| 2 283 945 | 5/1995 | United Kingdom | B60R 1/12 |
| 2 290 056 | 12/1995 | United Kingdom | B62B 1/12 |

OTHER PUBLICATIONS

*Gardeners Eden* Summer 1996, Workbench 36" x 20" x 33"H—At $198.
*Gardeners Eden* Summer 1996, Picket Fence Workbench #84–1053032 AT $225.
Dick Blick, Workbenches.
*Gardener's Supply Company* Spring 1996, Cedar Potting Bench at $280.

*Primary Examiner*—Richard M. Camby
*Assistant Examiner*—Jason S. Brooks
*Attorney, Agent, or Firm*—Welsh & Katz, Ltd.

[57] ABSTRACT

A convenient easy-to-maneuver assembly provides a user-friendly gardening center, work bench and cart. The assembly can be readily arranged to fit the needs of the user. The preferred assembly features a table with an ergonomic handle, a wheeled base, and strong composite posts comprising metal tubes encased within impact-resistant plastic sleeves. Preferably, the versatile assembly has interchangeable modules or inserts, such as bins, grates and cutting boards, which can be placed on the table and function as shelves between panels or walls that extend between the base and table. For further capacity and versatility, the assembly can have a superstructure comprising a riser shelf that is positioned above the table.

15 Claims, 8 Drawing Sheets

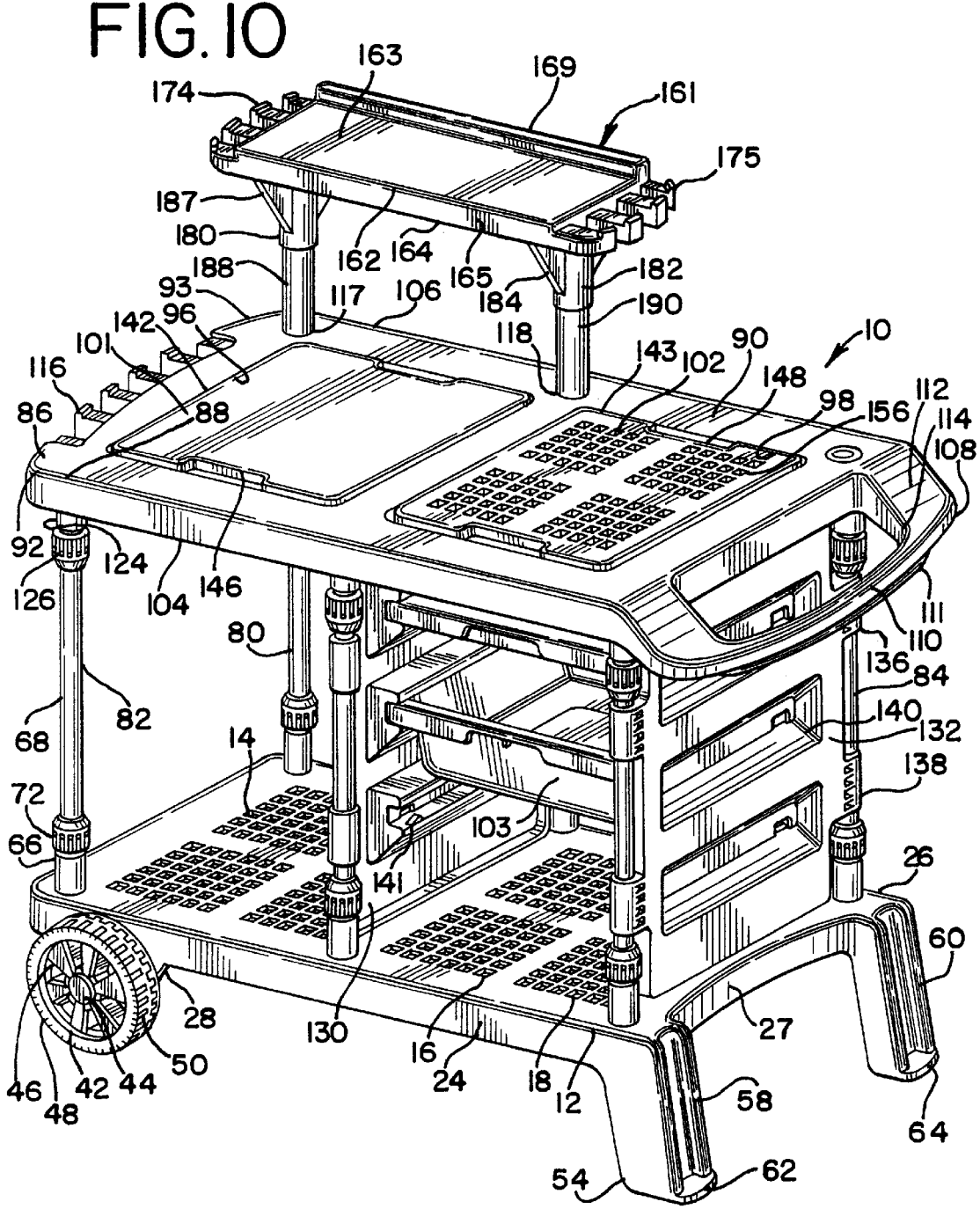

GARDENING CENTER

BACKGROUND OF THE INVENTION

This invention pertains to gardening and, more particularly to a cart for use in gardening.

Gardening is very popular throughout North America and the rest of the world. Some gardeners enjoy growing flowers. Other gardeners enjoy raising fruits, vegetables and various plants. Many gardeners carry gardening gloves and hand tools such as hand shovels, hand spades, hand hoes, hand weeders, pruning shears, scissors, snippers, etc. Gardeners often carry bags of potting soil, fertilizer, seed, etc., as well as sprinkling cans. Some gardeners carry cushions or seats.

Carrying all this garden equipment is cumbersome, awkward and bulky. It often requires many trips. In an effort to alleviate this problem, various totes, trays, crates and boxes have been used. Totes, crates, trays and boxes generally have limited capacity, carry few items and have a tendency to break, collapse and wear out. Metal wheelbarrows can be used but have a tendency to tip and spill their contents. Metal red wagons have also been used but with only limited success. Wheelbarrows and metal red wagons can rust and are not practical for long term storage or organization of gardening materials. Wooden carts are usually overly large, bulky, and awkward. Wooden carts can be flimsy and have a tendency to warp and sometimes tip over. Stationary metal shelving units and cabinets can be useful for storing various articles but are not generally portable or transportable nor particularly adapted for gardening tools and materials.

It is, therefore, desirable to provide an improved assembly for carrying gardening equipment and other materials, which overcomes most, if not all, of the preceding problems.

SUMMARY OF THE INVENTION

An improved versatile assembly is provided for use as a garden bench, gardening center, work bench, and cart. Advantageously, the user friendly assembly is attractive, easy to use, and fun. Desirably, the economical assembly has many uses, is lightweight, waterproof, safe, and dependable. Furthermore, the efficient assembly helps organize gardening tools, gardening gloves, plants, pots, bags of soil, fertilizer or other articles, for ready access and use.

The sturdy well-built assembly has a platform which provides a table and work bench to support gardening tools and other items. Strong non-corrosive composite posts are operatively connected to the platform to firmly elevate the platform above the ground. The special composite posts comprise metal tubes and plastic sleeves. The metal tubes provide elongated metal cores which are positioned within and protected by the plastic sleeves. The plastic sleeves annularly surround, protect and circumferentially enclose the metal tubes.

In the preferred form, the platform comprises a plastic table which has at least one compartment to receive an interchangeable module or insert, such as a bin, grate or shelf. A base, preferably a foraminous or perforated support base, can be positioned below the platform and has wheels operatively connected to it to provide for mobility and wheeling of the assembly. The base can have legs which can be positioned opposite the wheels. The table can also have a handle positioned above the legs to push or pull the table. The posts extend between and are connected to the base and table.

The side panels can be positioned sideways (laterally) or longitudinally along the front and back of the assembly, between the posts. The side panels extend upwardly and can be secured to the base and table. The same or other interchangeable inserts, such as a bin, grate or shelf, can slide into and be positioned between the side panels to serve as drawers or shelves and can be supported by ledges, ledge portions, pegs, braces, clips or other supports, which can be connected to and extend inwardly from the side panels. If desired, the side panels can enclose the entire space between the platform and the base to provide a cabinet.

The assembly can also have a superstructure comprising a riser shelf positioned above the table. The riser shelf can be smaller than the table and can provide an auxiliary, supplemental or second platform. Preferably, the riser shelf and/or table has hooks to hang tools or other articles. Riser posts can extend between and be connected to the riser shelf and the table to elevate the riser shelf above the table. The riser posts can comprise metal riser tubes which are positioned within, and are annularly surrounded by and protected by, the plastic sleeves. In some circumstances, it may be desirable that the posts comprise solid or hollow plastic posts or metal posts.

The assembly is preferably primarily constructed of durable plastic or resinous material which will not rot, splinter or warp, to enhance and maintain superb value and structural integrity. The elegantly solid composite posts preferably have steel cores or other internal metal tubes for strength and structural support, and are encased and protected by a plastic sleeve from water, liquid fertilizer and other corrosive chemicals, to prevent rust, corrosion and damage to the enclosed metal tubes. The bins, grates and solid shelves provide a variety of work surfaces to fit different jobs for greater flexibility and use. The bins, grates and solid shelves slide into the side panels to function as different shaped shelves for improved organization and adaptability. The wheels and handles of the assembly provide an easily moveable cart to conveniently move the bench around. The cart can be assembled with few or no tools. The hooks, which are preferably molded-in hooks, provide efficient and uncomplicated tool storage and help maintain uncluttered work surfaces. The riser shelf holds and keeps pots, accessories and other items out of the way and helps provide even better organization. The simple snap-together assembly can be arranged in different configurations and is useful for a variety of tasks.

A more detailed explanation of the invention is provided in the following description and appended claims, taken in conjunction with the accompanying drawings.

BRIEF DESCRIPTION OF THE EMBODIMENTS

FIG. 10 is similar to FIG. 1 except that the riser shelf has molded hooks.

DETAILED DESCRIPTION OF THE PREFERRED EMBODIMENTS

A mobile portable snap-together assembly 10 (FIGS. 1–5) is provided for use as a garden bench, gardening center, work bench, work station, and cart. The lightweight assembly is handy, easy to maneuver, sturdy, convenient, comfortable, and simple to use for women, adolescents, and men. The user-friendly assembly is primarily formed of a resinous construction and is molded of an impact-resistant plastic, such as polyethylene or polypropylene. While the preceding plastics are preferred for best results, in some circumstances it may be desirable to use other plastics or materials.

Figure 7:
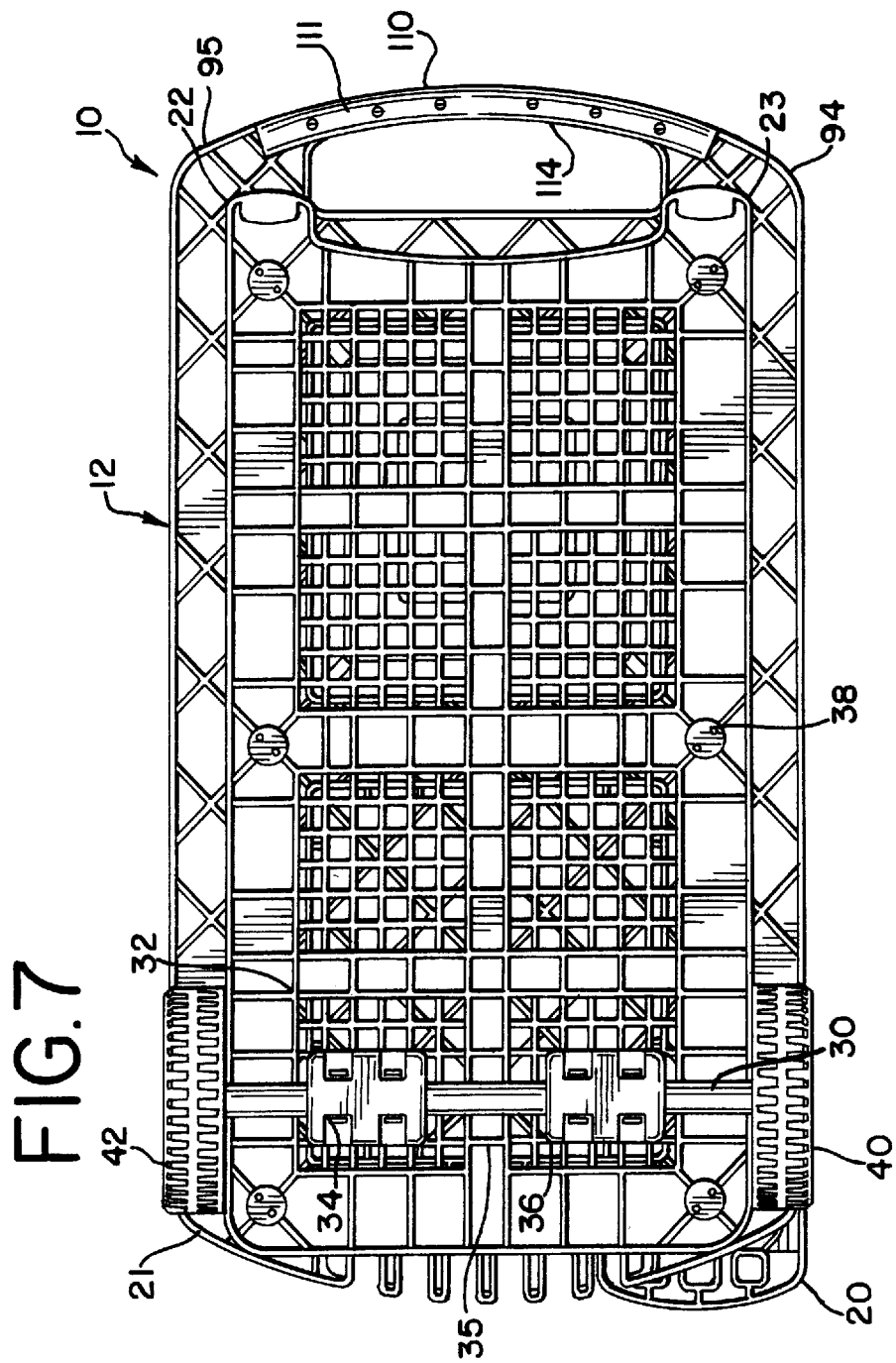
FIG. 7 is a bottom view of the assembly.
Figure 9:
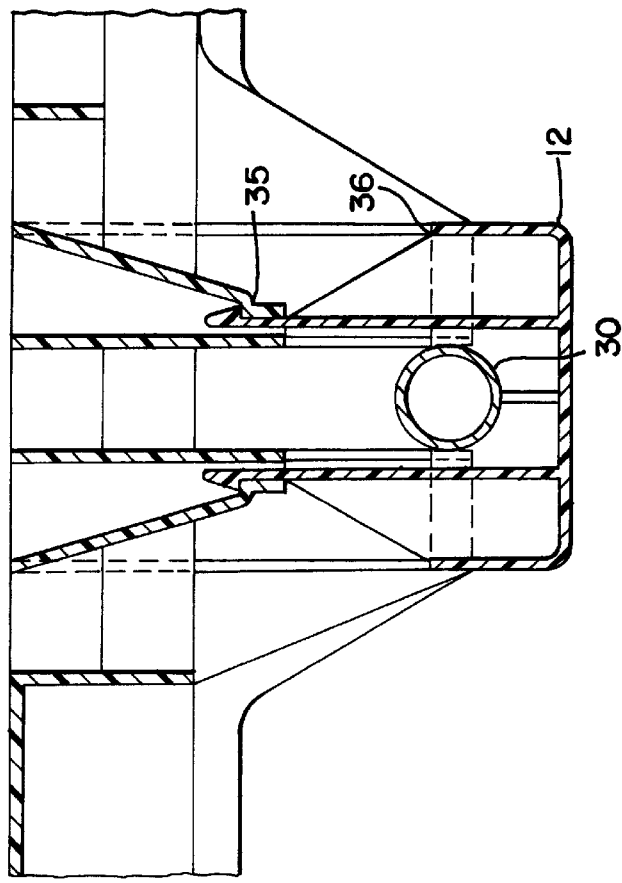
FIG. 9 is an enlarged cross-sectional view of the axle and part of the base of the assembly taken substantially along lines 9—9 of FIG. 1.

The assembly has an impact-resistant plastic base 12 (FIGS. 1 and 7) which provides a bottom support platform. The base comprises a foraminous perforated bench 14 with a flat or planar, horizontally extending, elongated, perforated base surface 16. The base has arrays, sets, series, or matrixes of upright apertures, openings, holes or passageways 18 for passage of water, liquid and solid particulates, such as dirt (soil), seeds, pebbles, granular fertilizer, small plant cuttings, flower cuttings, and particles (fines) of debris and other material. The base has rounded corners 20–23 (FIG. 7) at each end. Longitudinal and lateral base flanges 24–27 (FIG. 1) extend and depend integrally downwardly from the base surface 16. Laterally opposite wheel-engaging flanges 28 extend integrally downwardly from the longitudinal base flanges. A transverse axle 30 (FIGS. 4, 5, 7 and 9) extends laterally across and through the wheel-engaging flanges along the underside 32 (bottom) (FIG. 7) of the base in proximity to the rounded corners at one end of the base and can be supported by bearings and axle-supports 34–36. The bottom (undercarriage) of the base can have a lattice matrix base underside 38 (FIG. 7) for structural strength and support.

Figure 1:
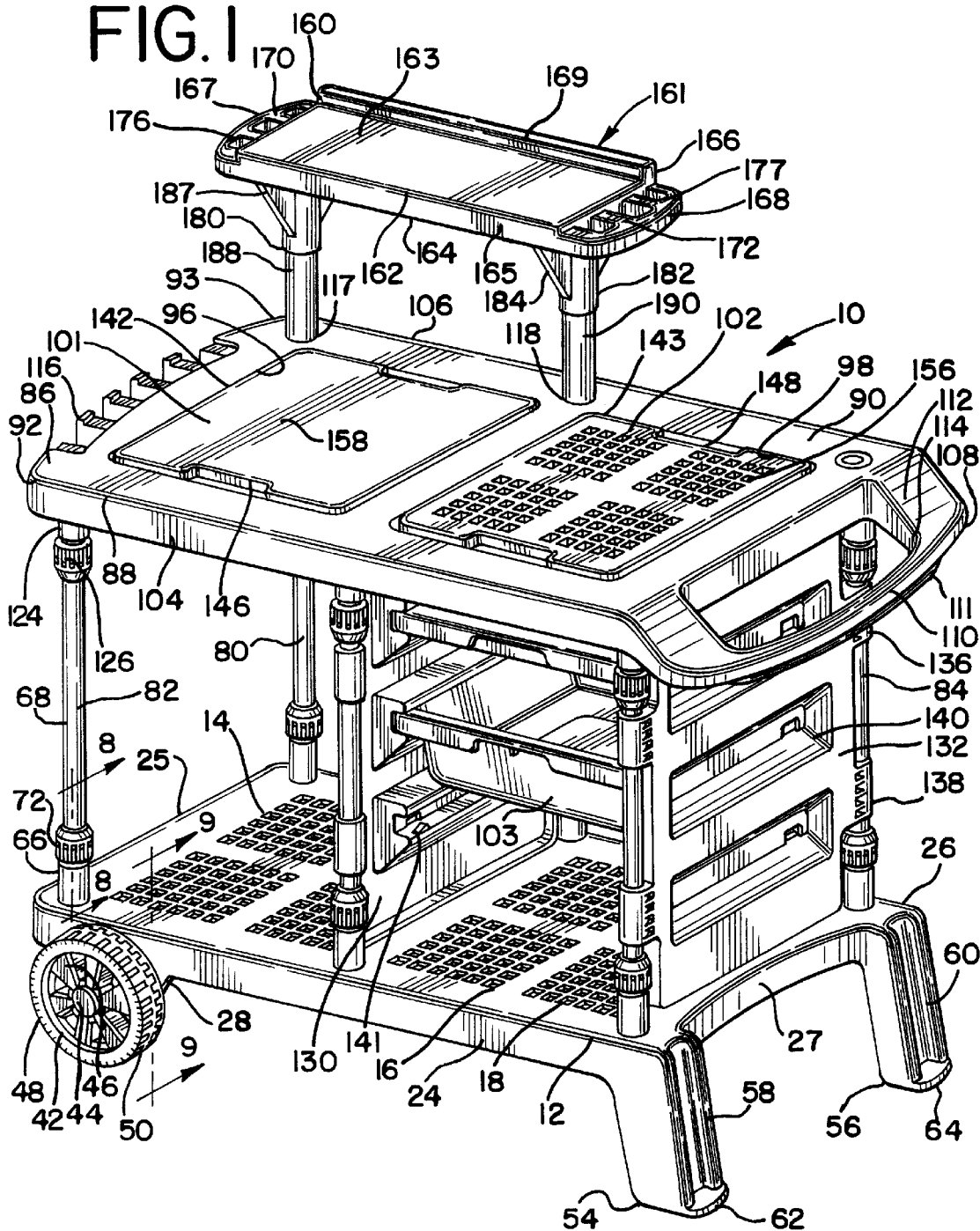
FIG. 1 is a perspective view of an assembly providing a gardening center, work bench and cart in accordance with principles of the present invention.
Figure 2:
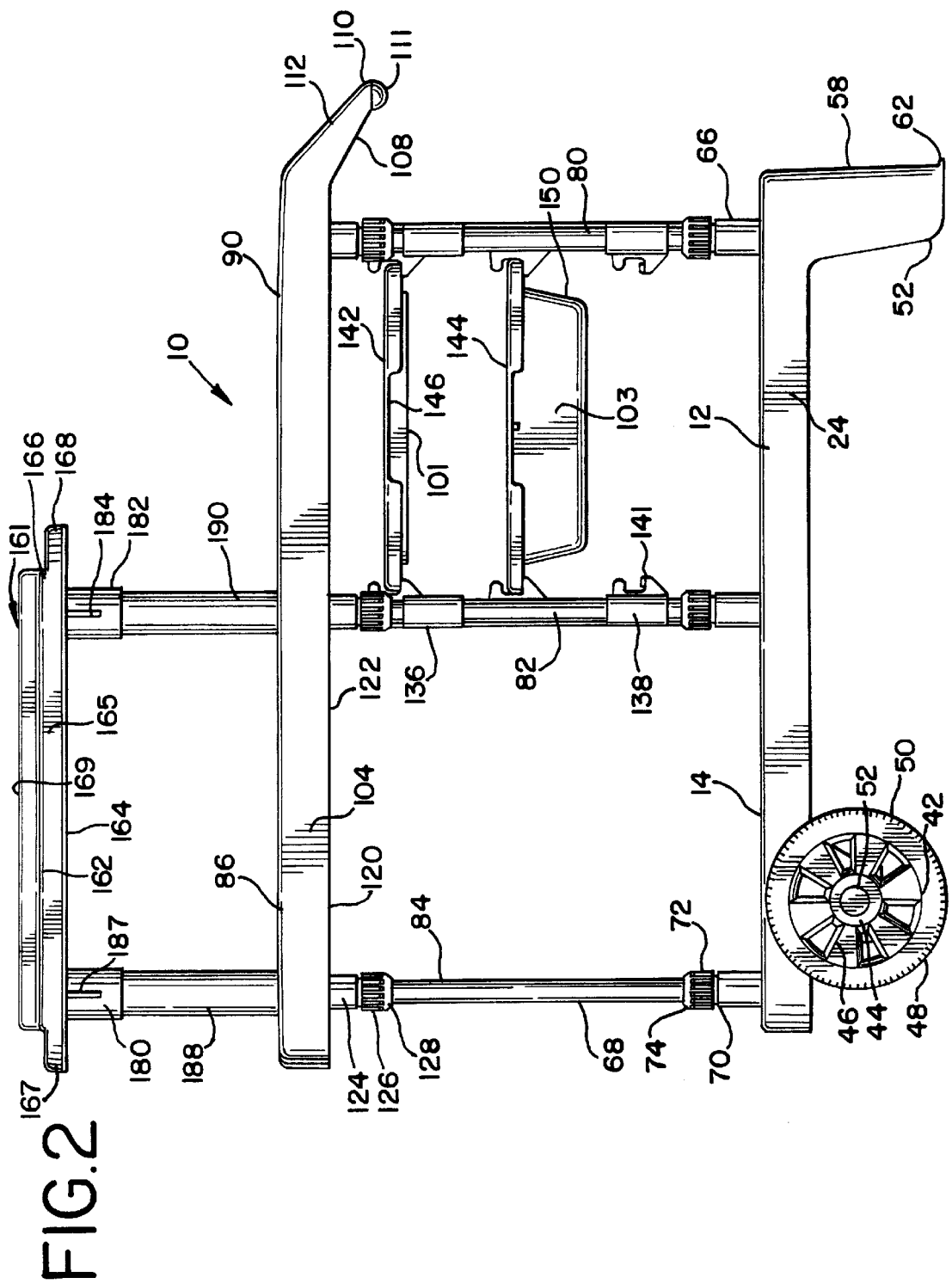
FIG. 2 is a front view of the assembly.
Figure 3:
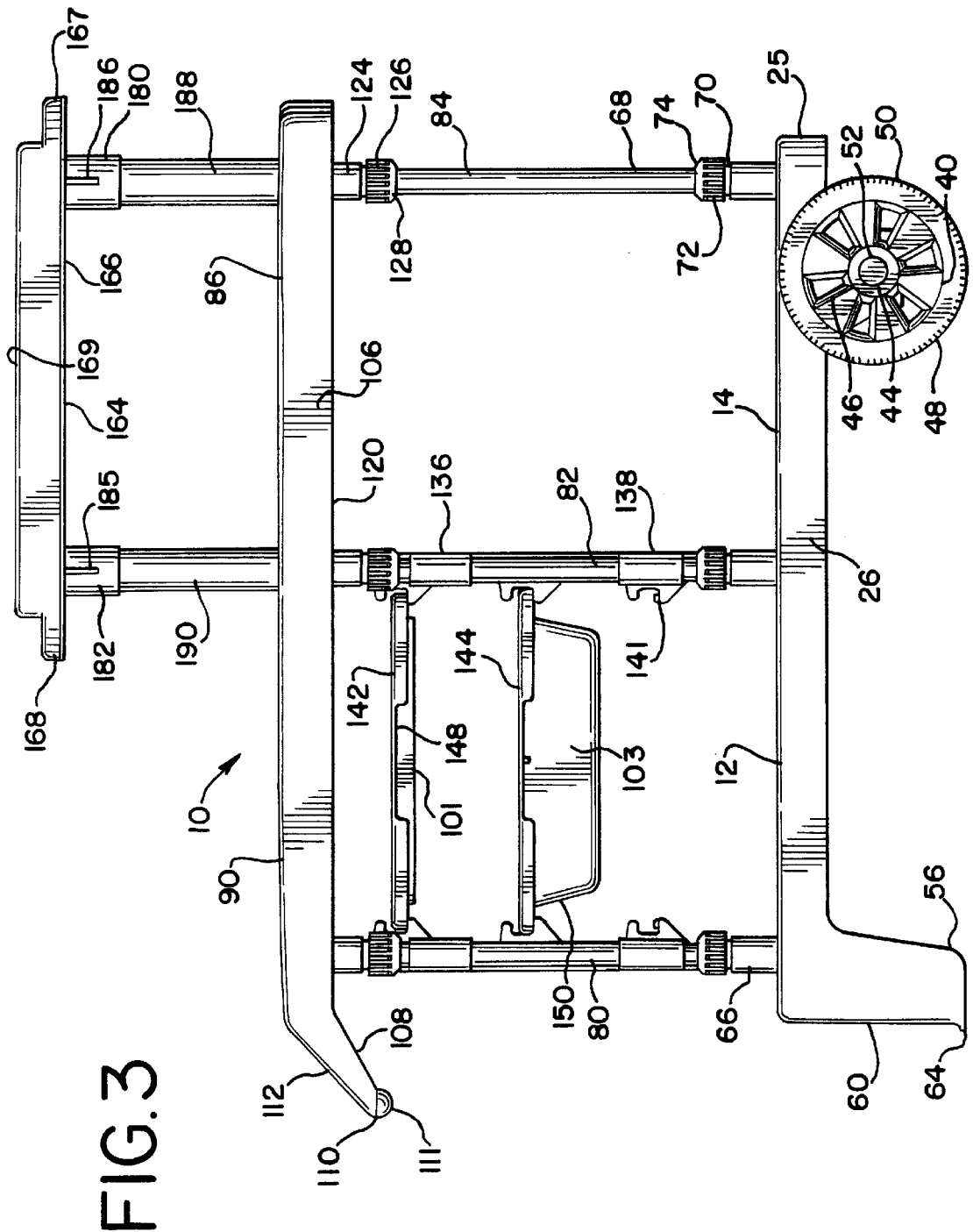
FIG. 3 is a back view of the assembly.
Figure 4:
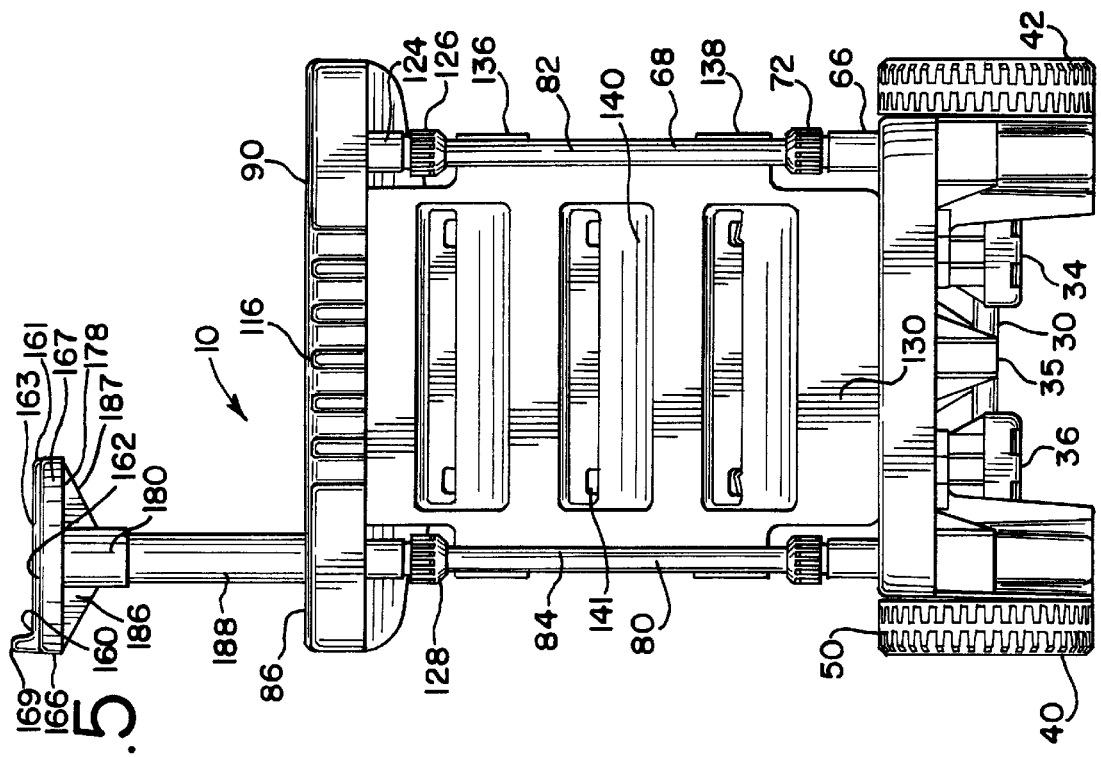
FIG. 4 is a right side view of the assembly.
Figure 5:
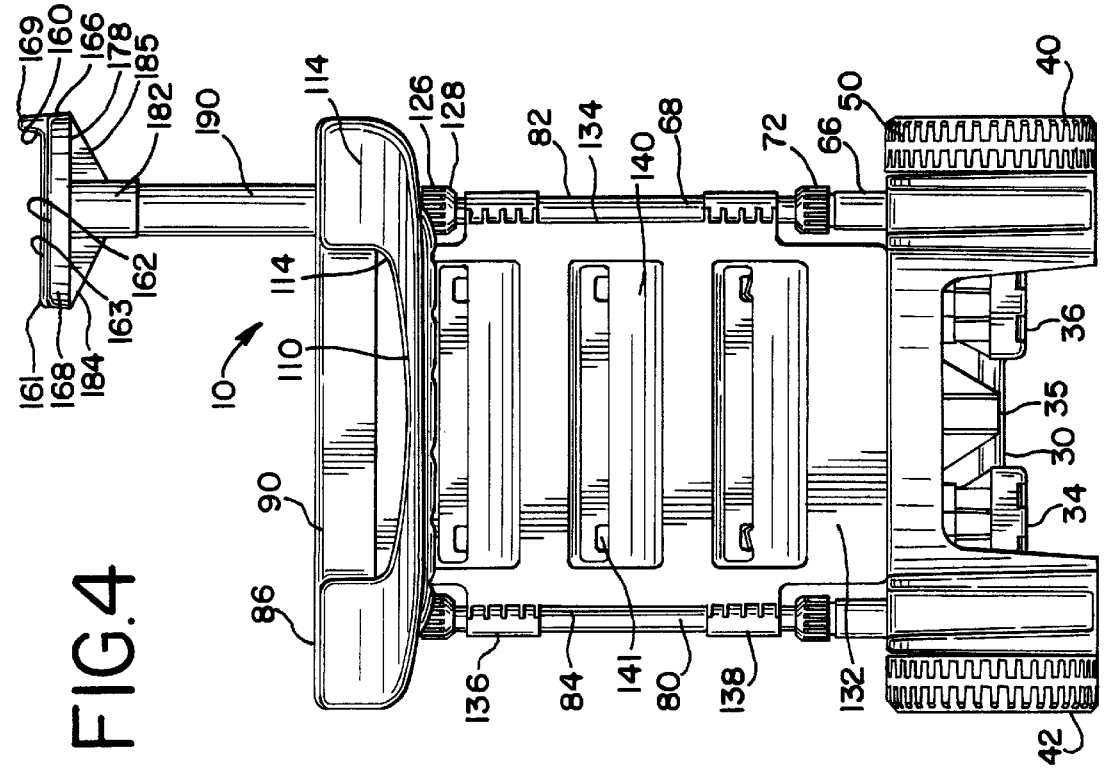
FIG. 5 is a left side view of the assembly.

Plastic all-terrain performance wheels 40 and 42 (FIG. 7) are securely mounted to the axle to elevate the base surface above the ground for wheeling, pushing, pulling, moving and transporting the assembly, gardening center and cart. As shown in FIGS. 1–3, each of the wheels has a plastic hub 44, plastic radial spokes 46 which extend radially and integrally outwardly from the hub, and a plastic tire 48 which annularly and circumferentially surrounds the hub and is integrally connected to the outer ends of the spokes. The tire can have treads 50 (FIGS. 1, 4 and 5) for better traction. Plastic end caps 52 (FIGS. 2–3) can cover the ends of the axle and can be positioned on or against the hubs.

The base can have legs 54 and 56 (FIG. 1) which extend integrally downwardly and longitudinally outwardly from the base flanges. The legs can be positioned in proximity to the rounded corners at the right end of the base at a location longitudinally opposite the wheels. The legs can have rounded concave shins 58 and 60 and rounded convex feet 62 and 64. Preferably, the legs extend downwardly to a depth below the base flanges for a distance equal to the depth of which the tires extend below the base flanges in order to maintain the base surface in a substantially horizontal and level position when the assembly, gardening center and cart is stationary or being pushed and not being tilted or lifted.

Figure 8:
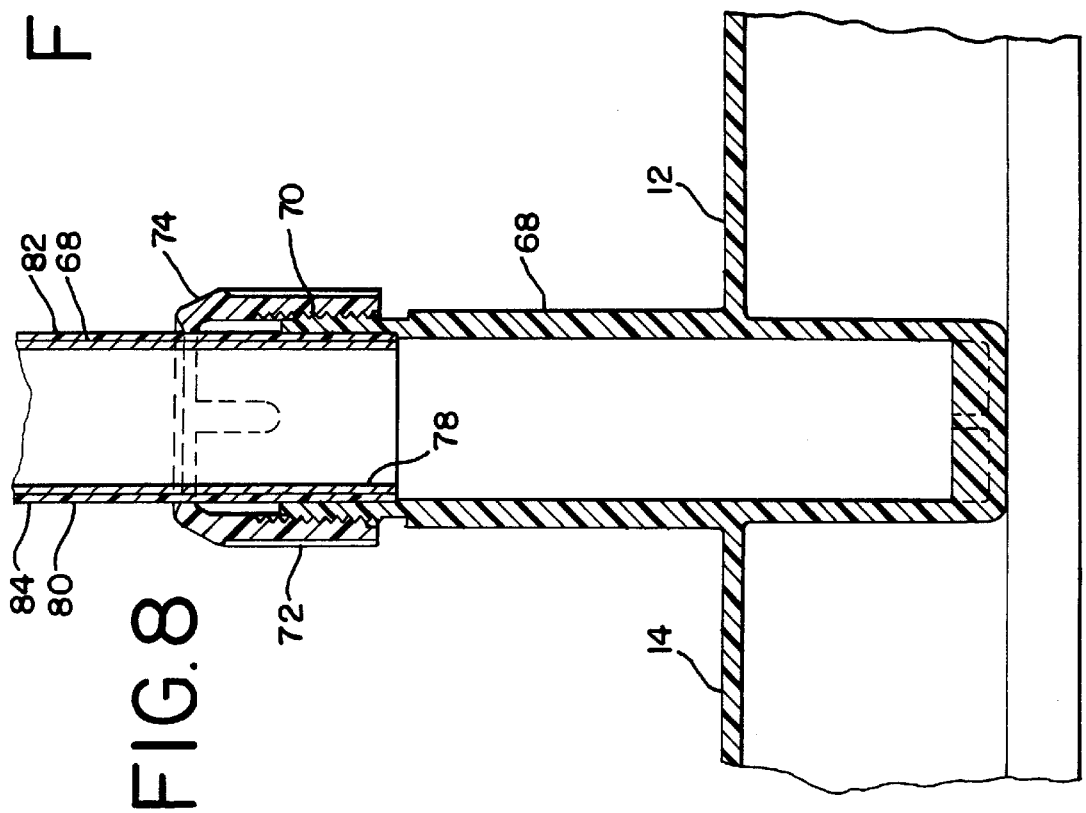
FIG. 8 is a an enlarged cross-sectional view of part of a composite post coupled to a pedestal of the base of the assembly taken substantially along lines 8—8 of FIG. 1.

The base can have a set or series of aligned, aliquotly uniformly spaced, upwardly extending post-engaging base pedestals 66 (FIGS. 1–5). The base pedestals can extend upwardly from the base surface and underside in proximity to the base flanges. Each of the base pedestals can be hollow to provide a base socket to snugly receive an upright vertical composite post 68 and can have an externally threaded upper portion 70, such as shown in FIG. 8, to provide an externally threaded bottom base stud to threadedly engage and securely receive a knurled, fluted, internally threaded, plastic bottom coupling nut 72 with a tapered, chamfered flared edge 74.

The posts 68 (FIGS. 1–5) provide strong sturdy support bars. As best shown in FIG. 8, each of the composite posts can comprise an internal metal tube 78, which provides a metal core, and an external impact-resistant plastic sleeve 80, which provides a plastic casing, sheath and outer shell. The plastic sleeve can have vertical ribs 82 and provide upright ridges and valleys 84. The metal tube is positioned within and protected by the plastic sleeve. The plastic sleeve annularly surrounds and circumferentially encloses the metal tube to protect the metal tube from water, acid rain, liquid fertilizer, corrosive chemicals, and other liquids, to prevent rust and corrosion of the metal tube. In the preferred embodiment, the metal tube comprises a steel tube, which provides a steel core, and the sleeve comprises a polyethylene sleeve or polypropylene sleeve. The steel core posts are preferably hollow to decrease the overall weight of the assembly, gardening center and cart. In some circumstances, it may be desirable that posts be solid or that other types of metal or plastic be used.

Figure 6:
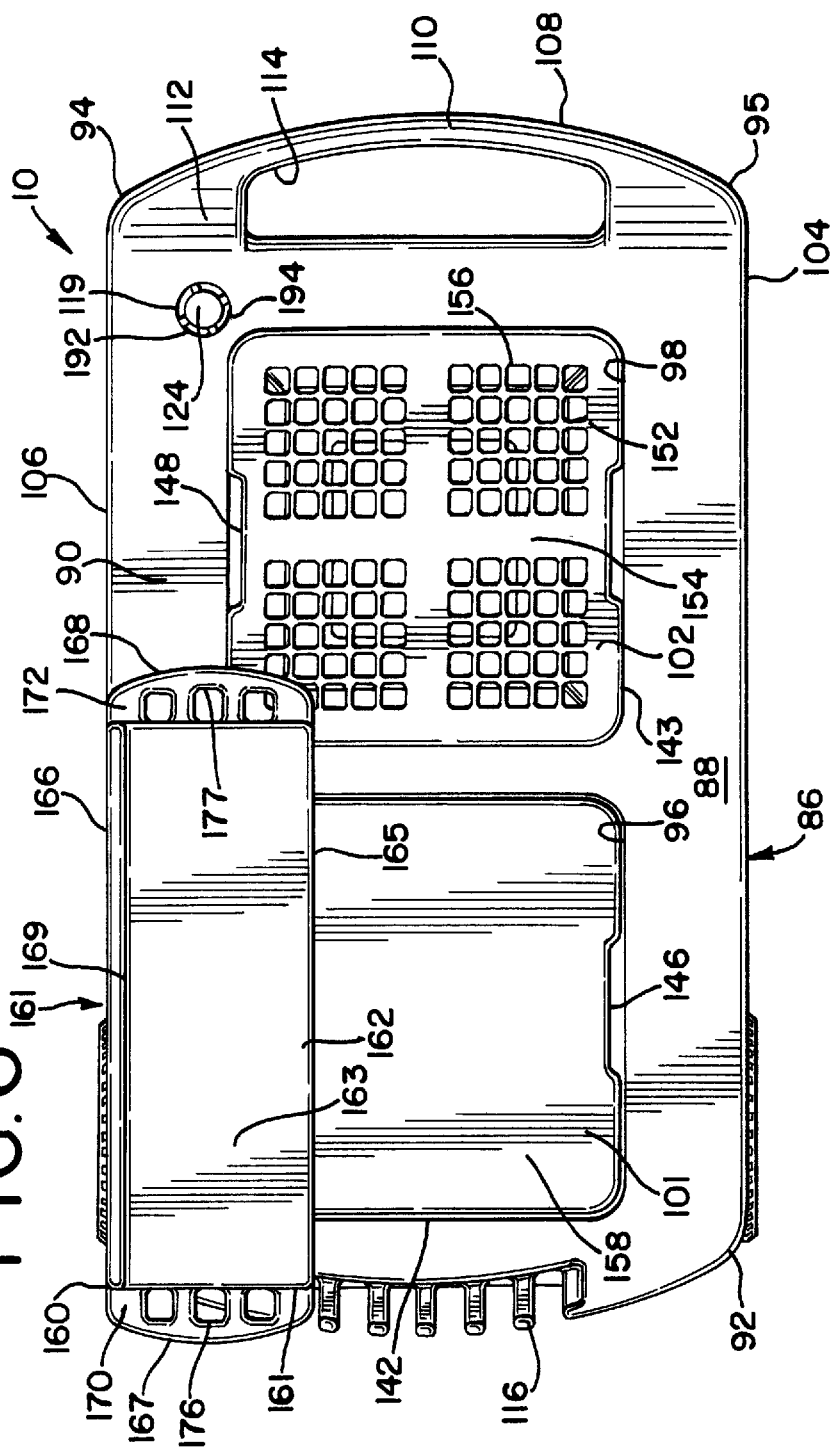
FIG. 6 is a top view of the assembly.

Positioned above the base is an impact-resistant, elongated, plastic table 86 (FIGS. 1 and 6). The table provides a top platform and comprises a bench top 88 with a substantially flat or planar, horizontally extending top surface 90. The top surface has rounded corners 92–95 (FIG. 6) at each end which can be aligned in vertical registration with the base corners. The top surface of the table has a pair of identical size and shape openings or cavities 96 and 98 with peripheral support ledges which provide symmetrical compartments and complementary chambers to receive interchangeable plastic modules 100–102 (FIGS. 1–3 and 6) that provide complementary inserts and accessories. The table has downwardly depending, longitudinal and lateral table flanges 104 and 106 which extend integrally downwardly from the top surface and can be aligned in vertical registration above the longitudinal and lateral base flanges, respectively.

A convenient, comfortable D-shaped or C-shaped ergonomic handle 108 (FIG. 1) extends integrally downwardly at an angle of inclination of 15°–75°, preferably 30°–60°, from the top surface of the table and is positioned and aligned above the legs. The handle has an arcuate, outwardly-curved lateral crossbar 110 which provides a convex rounded handgrip to push and pull the mobile assembly gardening center and cart. The bottom of the handle can have a rounded downwardly extending convex handgrip portion 111 (FIGS. 1–3) attached thereto. The inclined sides 112 of the handle extend between and are integrally connected to the crossbar and right end of the table and can provide hand pads or push pads. The crossbar has an outwardly curved configuration as viewed from the top (FIG. 6). The handle can also have a D-shaped opening 114 which provides a handhold to receive the fingers of both hands of the person pushing or pulling the assembly, gardening center and cart.

The left side of the table can have a set, series of array of integrally molded table hooks 116 (FIGS. 1 and 6) which provide upwardly extending hook-shaped fingers for hanging gardening tools, gardening gloves, gardening hats, visors, sunglasses, and other articles (items). The top of the table can have riser holes 117 and 118 (FIG. 1) and 119 (FIG. 6) along the back longitudinal flange.

The bottom 120 (FIGS. 2–3) of the table can have a lattice matrix under-structure 122 for support. Extending integrally downwardly from the bottom of the table are post-engaging top pedestals 124. The top pedestal are symmetrical to and aligned in registration with the base pedestals. Each of the top pedestals can be hollow to provide a top socket to snugly receive a composite post and can have an internally threaded lower portion to provide an externally threaded top stud to threadedly engage and securely receive a knurled, fluted, internally threaded, plastic top coupling nut 126 with a tapered, chamfered flared edge 128. The top and bottom coupling nuts can be symmetrical and similar to each other. The coupling nuts cooperate with the pedestal (threaded studs) to securely couple, firmly connect and removably hold the posts.

Versatile plastic, upright vertical side panels 130 and 132 (FIGS. 1, 4, and 5) can be positioned laterally (sideways) or longitudinally along the front and back of the assembly, gardening center and cart, between at least some of the posts. The side panels can be positioned opposite each other. While the side panels are shown sideways in a lateral position between the middle and rights posts, the side panels or additional side panels can be positioned sideways in a lateral position between the left and middle posts. Alternatively, the side panels can be positioned in a longitudinal position along the front and back of the assembly between the middle and right posts or between the left and middle posts. The side panels provide side walls with upright edges 134 (FIG. 4–5) and plastic ribbed tubular couplings or tubes 136 which extend outwardly from the edges and provide side panel-sockets 138 to snugly receive and securely engage the posts. The side panels can have inwardly extending, slanted or beveled, truncated depressions 140 and module-supports 141 (FIGS. 1–3) which provide ledges or ledge portions to slidably receive and support some of the interchangeable plastic modules so that the modules function as shelves and drawers.

The interchangeable modules 100–102 (FIGS. 1–3 and 6) provide complementary inserts and accessories molded of impact resistant plastic, such as polyethylene or polypropylene. The modules each have an upper peripheral edge 142–144 with a similar peripheral shape, configuration, profile, and maximum size in the horizontal direction as viewed from the top. The peripheral edge of each module can have laterally or longitudinal opposed cutaway portions or openings which provide hand grip sections 146 and 148 to facilitate manual removal, exchange and insertion of the modules. The modules include a plastic bin 103, a plastic grate 102 and a plastic solid work board 101 which provides a shelf and plate. The bin provides a receptacle and container with flared sidewalls 150 (FIGS. 2–3), which slope downwardly from the upper peripheral edge of the bin. The bin can have a generally flat or planar imperforate bottom, which is integrally connected to the flared sidewalls. The grate can comprise a foraminous grid 152 (FIG. 6) with a perforated grip surface 154 which extends integrally inwardly from the upper peripheral edge of the grate. The grate has arrays, series, sets, or matrixes of grate apertures 156 which provide vents and grate passageways for passage of fluids (e.g. liquids) and solid particulates, such as dirt (soil), seeds, pebbles, granular fertilizer, cuttings of flowers and small plants, and particles (fines) of debris and other material. The work board (shelf) can have a substantially flat or planar, imperforate, impervious solid top and bottom surface 158. The top surface of the work board extends integrally between and connects the upper peripheral edge of the work board.

The assembly, gardening center and cart, can have a superstructure 160 (FIGS. 1–6) which provides a supplemental and auxiliary platform 161. The superstructure can be positioned above the back left or back right of the table, as desired. The superstructure has a riser shelf 162 molded of impact-resistant plastic, such as polyethylene or polypropylene. The riser shelf can be much smaller than the table. The riser shelf can have a substantially flat or planar, imperforate, horizontally-extending riser support, and a top surface 163 with a downwardly-depending skirt 164. The skirt extends integrally downwardly from the riser top surface to provide peripheral upright riser walls including a riser front wall 165, riser rear wall 166, and rounded, convex, curved, lateral, riser end walls 167 and 168. Extending integrally upwardly from the riser top surface and riser rear wall is an upwardly-extending longitudinal back (rear) flange 169, which provides a vertical, upright abutment surface. The riser shelf also has lateral, horizontal, foraminous, perforated, riser end surfaces 170 and 172 which extend laterally and integrally outwardly from the riser top surface and riser shelf at a level slightly below the riser top surface. The riser end surfaces can have laterally opposed, outwardly extending, integrally molded, riser hanger hooks 174 and 175 (FIG. 10) and/or slots 176 and 177 (FIGS. 1 and 6) which provide tool-receiving openings to hang gardening tools, gardening gloves, gardening hats, visors, sun glasses, and other articles. The riser hanger hooks can extend integrally outwardly from the riser support top surface.

The bottom (riser bottom) 178 (FIGS. 4–5) of the riser shelf can have a lattice matrix under structure and downwardly extending, vertical riser tubes 180 and 182 which provide upper riser sockets. Reinforcement ribs or flanges 184–187 integrally connect the bottom of the riser shelf to the riser tubes. The riser tubes fit upon and telescopically engage vertical riser posts 188 and 190. The riser posts can comprise hollow impact-resistant plastic tubes. The riser posts can also have a metal core (metal tube) positioned within a plastic sleeve, as in the main posts between the base and table. The riser posts extend vertically between the table and the riser shelf to elevate the riser shelf above the table. The top of the riser posts are positioned in and snugly engage the riser tubes, which extend downwardly from the riser shelf. The bottom of the riser posts are positioned in and snugly engage a set or series of riser holes in the table. The riser holes provide upright riser openings and bottom riser sockets positioned along and in proximity to the back longitudinal table flange and back of the table. The riser sockets can have inwardly extending radial guide ribs 192 (FIG. 6) and horizontal arcuate segments 194, which are integrally connected to downwardly extending post-receiving sockets (pedestals or studs). The radial guide ribs and arcuate segments cooperate with the riser holes and post-receiving sockets, to snugly engage the riser posts. Preferably, the left riser hole is slightly larger and aligned in registration with and concentric to the back left top post-receiving socket (pedestal) stud so that the left riser post can telescopically engage and sit upon the back left top post-receiving socket and the middle center riser hole is slightly larger and aligned in registration with and concentric to the back middle, center post-receiving socket so that the middle riser post can telescopically engage and sit upon the back middle top post-receiving socket. Also, the right riser hole 119, (FIG. 6) can be slightly larger and aligned in registration with and concentric to the back right post-receiving socket (pedestal) 124 so that the right riser post can telescopically engage and sit upon the back right top post-receiving socket, when the riser shelf is mounted on the right side of the assembly.

It can be appreciated that the table, base, posts, sidewalls, interchangeable modules, and riser shelf cooperate with each other to provide a handy mobile assembly, gardening center, and cart to support and carry tools and other items (articles) in a more organized and accessible manner for use in gardening, in the garage, or in the home. The assembly can also be used to provide: a hospital cart, food service cart, beverage cart, or a cart for a backyard barbecue.

Among the many advantages of the assembly, gardening center, work bench, and cart are:

1. Superb performance
2. Excellent storage and organization of tools and gardening materials.
3. Superior quality
4. Simple to assembly
5. Easy to use
6. Lightweight
7. Versatile
8. Fun
9. Sturdy
10. Safe
11. Flexible
12. Handy
13. Mobile
14. Durable
15. Reliable
16. Economical
17. Efficient
18. Effective
19. Attractive
20. Convenient Although embodiments of the invention have been shown and described, it is to be understood that various modifications and substitutions, as well as rearrangements of parts and components, can be made by those skilled in the art without departing from the novel spirit and scope of this invention.

What is claimed is:

1. A mobile assembly, comprising:
   a wheeled cart having
   a plastic base providing a bottom support platform,
   wheels operatively connected to said bottom support platform for wheeling said base;
   plastic modules selected from the group consisting of a bin, a shelf, and a grate;
   a plastic table providing a top platform comprising a bench top positioned above said base, said table having compartments for receiving said plastic modules; and
   composite upright posts comprising metal tubes and plastic sleeves annularly surrounding said metal tubes, said metal tubes being positioned in said plastic sleeves, said posts extending substantially vertically between and connecting said base and said table and elevating said table above said base.

2. A mobile assembly in accordance with claim 1 including a handle connected to said table for pushing or pulling said cart.

3. A mobile assembly in accordance with claim 1 including plastic side panels extending between and connected to some of said posts, and said side panels having inwardly facing module supports for slidably receiving and supporting said modules.

4. A mobile assembly in accordance with claim 1 including:
   a plastic superstructure comprising a riser shelf;
   riser posts extending vertically between and connecting said riser shelf and said table for elevating said riser shelf above said table;
   said riser shelf comprises an auxiliary platform disposed above said top platform; and
   at least one of said platforms has hooks for hanging articles.

5. A mobile assembly for use as a garden bench, a gardening center, a work bench, a work station, or a cart, comprising:
   an impact-resistant plastic base providing a bottom support platform comprising a foraminous bench with a substantially planar horizontally-extending perforated elongated base surface defining an array of apertures for passage of water, liquids and solid particulates, said base having rounded corners at each end, downwardly depending longitudinal base flanges extending integrally downwardly from said base surface, an axle extending laterally across and rotatively coupled to said base flanges in proximity to said rounded corners at one end, plastic all-terrain performance wheels securely mounted to said axle for elevating said base surface above the ground and for wheeling and transporting said mobile assembly, said wheels each having a plastic hub, plastic radial spokes extending radially and integrally outwardly from said hub, and a plastic tire annularly surround said hub and integrally connected to said spokes, plastic caps positioned on said hub and covering ends of said axle, legs extending integrally downwardly from said base flanges in proximity to the rounded corners at the other end of said base, said legs being disposed longitudinally opposite said wheels and extending downwardly to a depth below said base flanges for a distance substantially equal to the depth said tires extend below said base flanges to maintain said base surface in a substantially horizontal position when said mobile assembly is stationary or being pushed and not being tilted or lifted, and said base having a set of upwardly extending post-engaging pedestals comprising externally threaded bottom studs extending upwardly from said base surface in proximity to said base flanges;
   interchangeable plastic modules providing complementary inserts and accessories, said modules each having an upper peripheral edge with a substantially similar peripheral shape and maximum size in the horizontal direction, said upper peripheral edge having lateral cutaway portions providing hand grip sections for facilitating manual removal and insertion of said modules, said modules comprising
   a plastic bin with flared sidewalls sloping downwardly from the upper peripheral edge of said bin and a bottom extending integrally between and connecting said flared sidewalls;
   a substantially solid plastic shelf of impact-resistant plastic having a substantially planar imperforate surface extending integrally between and connecting the upper peripheral edge of said shelf;
   a plastic grate providing a foraminous grid, said grid having a perforated grid surface extending integrally inwardly from the upper peripheral edge of said grate, said grate defining an array of grate apertures providing vents and grate passageways for passage of fluids and solid particulates;

an impact-resistant plastic table providing a top platform comprising a bench top positioned above said base, said table having a substantially planar elongated horizontally-extending top surface with rounded corners at each end positioned above and aligned in registration with the corners of said base, said top surface having compartments defining openings providing cavities and chambers for receiving some of said modules, said table having downwardly depending longitudinal and lateral table flanges extending integrally downwardly from said top surface, said longitudinal table flanges of said table being substantially aligned in registration with said longitudinal base flanges of said base, a downwardly extending ergonomic handle extending integrally downwardly at an angle of inclination from said top surface, said handle being positioned above said legs and having an arcuate outwardly-curved lateral crossbar providing a convex bight and rounded handgrip for pushing and pulling said mobile assembly, said crossbar having an outwardly curved configuration as viewed from the top, said table having a bottom with a lattice matrix understructure for support, a set of downwardly extending post-engaging pedestals comprising externally threaded top studs extending downwardly from said bottom of said table and substantially aligned in registration with said bottom studs of said base;

composite posts comprising metal tubes and plastic sleeves annularly surrounding said metal tubes, said metal tubes being positioned within and protected by said plastic sleeves;

internally threaded plastic nuts with tapered chamfered edges for threadedly engaging said externally threaded studs of said table and base to secure said posts to said table and base;

plastic upright side panel positioned laterally or longitudinally between at least some of said posts, said panels being positioned opposite each other and having inwardly extending module-supports for slidingly receiving and supporting some of said modules, said panels having sidewalls with inwardly extending slanted truncated depressions, and said panels having upright edges and plastic couplings extending outwardly from said edges for providing panel sockets to receive and securely engage said posts; and said base, table, posts and sidewalls cooperating with each other to provide a mobile assembly for supporting and carrying tools and other articles for use in gardening a garage, or in a home.

6. A mobile assembly in accordance with claim 5 wherein:

said table defines a set of riser openings, said riser openings extending vertically through said table and aligned in registration with some of said top studs in proximity to and along one of said longitudinal table flanges;

a plastic riser shelf providing a supplemental platform and superstructure positioned above said table, said riser shelf having a substantially planar horizontally-extending riser support surface, an upwardly extending longitudinal flange providing an upright abutment surface, a riser bottom with downwardly extending riser tubes providing riser sockets; and riser posts positioned in and snugly engaging said riser sockets and riser openings, and said riser posts extending substantially vertically between said table and said riser shelf for elevating riser shelf above said table.

7. A mobile assembly in accordance with claim 6 wherein:

said top studs of said table comprise hollow studs; and said riser posts comprise riser tubes for telescopically engaging some of said hollow studs.

8. A mobile assembly in accordance with claim 6 comprising:

hooks for hanging tools and other articles, said hooks being selected from the group consisting of plastic table hooks extending integrally outwardly from said table and positioned generally opposite said handle; and riser hooks extending integrally outwardly from said riser shelf.

9. A mobile assembly in accordance with claim 5 wherein:

said metal tubes comprise steel tubes;

said plastic sleeves comprise extruded vertically lined plastic sleeves selected from the group consisting of polyethylene and polypropylene, and said sleeves having upright ridges and valleys.

10. A mobile assembly for use as a garden bench, a gardening center, a work bench, a work station, or a cart, comprising:

a molded base providing a bottom support platform defining a foraminous bench with a substantially planar horizontally-extending perforated elongated base surface defining an array of apertures for passage of water, liquids and solid particulates, said base having downwardly depending base flanges adapted to receive an axle extending laterally across and rotatively coupled thereto, said base including wheels securely mounted to said axle for elevating said base surface above the ground and for transporting said mobile assembly, said base further including legs extending-downwardly from said base in spaced relation to and disposed opposite said wheels, said legs extending downwardly for a distance substantially equal to the depth said wheels extend below said base flanges to maintain said base surface in a substantially horizontal position when said mobile assembly is supported by aid legs and said wheels, said base having a plurality of post-engaging members each having an externally threaded bottom stud extending upwardly from said base surface;

interchangeable modules providing complementary inserts and accessories, said modules each having an upper peripheral edge with a substantially similar peripheral shape, said modules comprising:

a molded bin having sidewalls extending downwardly from the upper peripheral edge of said bin and a bottom extending integrally between and spanning said sidewalls;

a molded shelf having a substantially planar imperforate surface extending integrally between and connecting the upper peripheral edge of said shelf;

a molded grate providing a foraminous grid, said grid having a perforated grid surface extending integrally inwardly from and spanning the upper peripheral edge of said grate, said grate defining an array of apertures for passage of fluids and solid particulates;

a molded table providing a top platform positioned above said base, said table having a substantially planar, horizontally-extending top surface generally aligned in registration with said base, said top surface having compartments defining cavities and chambers for receiving some of said modules, said table having downwardly depending flanges extending from said top surface, said flanges of said table being substantially aligned in registration with said base flanges, a handle extending from said top surface and being positioned above said legs for pushing and pulling said mobile assembly, said table including a bottom with an understructure for support, and further including a plurality of post-engaging members each having an externally threaded top stud extending downwardly from said bottom of said table and substantially aligned in registration with a respective one of said bottom studs of said base;

composite posts comprising metal tubes and plastic sleeves annularly surrounding said metal tubes, said metal tubes being positioned within and protected by said plastic sleeves;

internally threaded nuts for threadedly engaging said externally threaded studs of said table and base to secure said posts to said table and base, said posts being secured to said base and said table in spaced parallel relation to one another wherein said base, table, and posts cooperate with each other to provide a mobile assembly for supporting and carrying tools and other articles for use in gardening, in a garage, or in a home.

11. A mobile assembly in accordance with claim 10 including one or more plastic upright side panels positioned laterally or longitudinally between at least some of said posts, said panels being positionable opposite each other and having module-supports for slidingly receiving and supporting some of said modules, said panels having couplings extending outwardly from edges thereof for receiving and securely engaging said posts.

12. A mobile assembly in accordance with claim 10 including a superstructure having a riser shelf positioned above said platform and riser posts extending between and connecting said riser shelf and said platform for elevating said riser shelf above said platform.

13. A mobile assembly in accordance with claim 10 wherein said platform is a first platform providing a table top, wherein said riser shelf provides a second platform, said second platform being smaller than said first platform, and wherein at least one of said first and second platforms has hooks for hanging tools or other articles.

14. A mobile assembly in accordance with claim 10 wherein said handle is formed as a downwardly extending ergonomic handle extending downwardly at an angle of inclination from said top surface of said table, said handle being positioned above said legs and having an arcuate, outwardly-curved lateral crossbar.

15. A mobile assembly in accordance with claim 11 wherein said side panels enclose the space between said platform and base for providing a cabinet.

* * * * *